United States Patent
Takita et al.

(10) Patent No.: US 9,825,728 B2
(45) Date of Patent: Nov. 21, 2017

(54) DEMAND ACCOMMODATION CHANGING ORDER DETERMINATION METHOD

(71) Applicant: FUJITSU LIMITED, Kawasaki-shi, Kanagawa (JP)

(72) Inventors: Yutaka Takita, Kawasaki (JP); Tomohiro Hashiguchi, Inagi (JP); Kazuyuki Tajima, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 14/628,410

(22) Filed: Feb. 23, 2015

(65) Prior Publication Data

US 2015/0280985 A1    Oct. 1, 2015

(30) Foreign Application Priority Data

Mar. 28, 2014    (JP) ................. 2014-070374

(51) Int. Cl.
*H04J 14/02* (2006.01)
*H04L 12/24* (2006.01)

(52) U.S. Cl.
CPC ...... *H04J 14/0227* (2013.01); *H04J 14/0257* (2013.01); *H04L 41/0896* (2013.01); *H04L 41/145* (2013.01); *H04L 41/0823* (2013.01); *H04L 41/12* (2013.01)

(58) Field of Classification Search
CPC combination set(s) only.
See application file for complete search history.

(56) References Cited

U.S. PATENT DOCUMENTS

2010/0061401 A1*  3/2010  Nakahira .......... H04L 12/5695
                                              370/468
2012/0315045 A1*  12/2012  Spector ............ H04Q 11/0067
                                              398/66

FOREIGN PATENT DOCUMENTS

JP            2012-199644 A    10/2012

* cited by examiner

*Primary Examiner* — Yee Lam
(74) *Attorney, Agent, or Firm* — Fujitsu Patent Center

(57) ABSTRACT

A processor executes the following processes. An obtainment process obtains a first number of lines, which represents a number of lines that are deleted after changing, among lines that pass through the same line route. An extraction process extracts a line for which a first demand, which is accommodated before and after changing, does not exist. The extraction process further extracts lines in descending order of a band of the first demand from among lines including first demands until a total number of extracted lines reaches the first number of lines when the number of the extracted lines is smaller than the first number of lines. Then, a fixation process fixes a first demand accommodated in a line that has not been extracted. A deletion process deletes the extracted lines. A determination process determines an order of changing line routes of demands.

6 Claims, 20 Drawing Sheets

DEMAND ACCOMMODATION CHANGING ORDER DETERMINATION METHOD

CROSS-REFERENCE TO RELATED APPLICATION

This application is based upon and claims the benefit of priority of the prior Japanese Patent Application No. 2014-070374, filed on Mar. 28, 2014, the entire contents of which are incorporated herein by reference.

FIELD

The embodiments discussed herein are related to a demand accommodation changing order determination method, and a non-transitory computer-readable recording medium.

BACKGROUND

In WDM optical networks, TDM is utilized to obtain time slots by separating, by a prescribed period of time, a communication bandwidth (an amount of data that can be communicated in units of time) of optical lines and to assign the obtained time slots to demands, and thereby the demands are accommodated in the optical lines. In the explanations below, a WDM optical network is also referred to as a network. Also, a communication bandwidth is also referred to as a band. Further, an optical line is also referred to as a line. A time slot is also referred to as a slot.

WDM is an abbreviation for Wavelength Division Multiplexing. In a WDM optical network, wavelength division multiplexing is conducted so that a plurality of optical lines are included in an optical fiber. TDM is an abbreviation for Time Division Multiplexing.

Demands are requests for the use of resources in a network in which a station serving as a starting point and a station serving as an ending point and a requested band are specified by users. Optical lines are lines that are used for optical communications for which optical-line routes connecting a station serving as a starting point and a station serving as an ending point are determined. In the explanations below, optical-line routes are also referred to as routes. Also, a station serving as a starting point is also referred to as a starting station. A station serving as an ending point is also referred to as an ending station.

When a demand is to be accommodated in an optical line in a network, a network design device 1 as illustrated in for example FIG. 1 is used. Starting the operation of a network 101, the network design device 1 sets an optical-line route of optical lines that accommodate demands in such a manner that resources (node devices 111 through 117 and links 121 through 126) of the network 101 are utilized effectively. Then, the network design device 1 accommodates demands in optical lines that pass through a set optical-line route. In the explanations below, an optical-line route of optical lines that accommodate demands are also referred to as routes of demands. Accommodation of demands in optical lines in a network is also referred to as accommodation of demands in a network. Also, when the node devices 111 through 117 are not discriminated from each other, they are also referred to as node devices 110. Further, when the links 121 through 126 are not discriminated from each other, they are also referred to as links 120.

When for example a demand requesting the use of a band between stations A and E has been given, the network design device 1 sets a short route of the demand as illustrated in FIG. 2, and accommodates the demand in an optical line 201 in the set route. Thereby, the network design device 1 conducts designing that utilizes resources of the network more effectively than for example a case where the demand is accommodated in an optical line 202, which passes through an optical route longer than the optical line 201.

The network design device 1 uses for example the switching function of the node device 110 that is provided in a station, and thereby assigns slots of optical lines to a demand. Thereby, the network design device 1 can change a route of a demand by switching optical lines that accommodate the demand. When a network is based on OTN (Optical Transport Network), the switching function is implemented by for example the ODU (Optical Data Unit)-XC (Cross Connect) function.

In networks during operations, it often becomes a situation where an optical line that accommodates a demand is changed due to changes in the demand, changes in network topologies and changes in the network configuration and resources in the networks are not utilized effectively. As an example, there is a situation where a route of a demand is made longer by making a detour as illustrated in for example a network 300 illustrated in FIG. 3A.

In such a case, the network design device 1 conducts reoptimization of a route of a demand in order to utilize resources of the network effectively, and executes a process of shortening the route of the demand. As an example of this, there is a process of shortening a route of a demand by referring to information representing the starting and ending stations contained in the demand in the network 300 as illustrated in FIG. 3B. Thereby, the network design device 1 reduces the number of slots to be used from (11 spans×4) slots illustrated in FIG. 3A to (5 spans×4) slots illustrated in FIG. 3B so as to utilize the resources effectively. Also, in FIG. 3, demands D5 through D8 are demands that resulted from changing the routes of demands D1 through D4. In the explanations below, a process of changing a route of a demand for shortening the route of the demand is also referred to as a reoptimization process.

As another related technique, there is a virtual network management system that includes a parameter determination unit, a priority degree calculation unit and a virtual node determination unit, and that determines a physical node generating a virtual node in response to a generation request of a virtual network. The parameter determination unit determines a weighting coefficient for the difference between a request position of a virtual node and a physical node position at the time of the priority degree determination of the physical node. The priority degree calculation unit uses a physical node state, a physical link state, a weighting coefficient determined by the parameter determination unit, a request position of a virtual node and a physical node position so as to calculate a priority degree with respect to the physical node. The virtual node determination unit determines a physical node that generates a virtual node on the basis of the priority degree calculated by the priority degree calculation unit (For example, Japanese Laid-open Patent Publication No. 2012-199644).

The network design device of the above-described communication technique has a problem that for example increase in the number of demands for which changing of routes is considered in reoptimization of routes of demands leads to increase in loads of the calculation process in the reoptimization process.

SUMMARY

According to an aspect of the embodiments, a demand accommodation changing order determination method, executed by a processor, that obtains an order of changing routes of demands includes an obtainment process, an extraction process, a fixation process, a deletion process and a determination process. The obtainment process obtains a first number of lines, which represents a number of lines that are deleted after changing, among lines that pass through the same line route. The extraction process extracts a line for which a first demand, which is accommodated before and after changing, does not exist. The extraction process further extracts lines in descending order of a band of the first demand from among lines including first demands until a total number of extracted lines reaches the first number of lines when the number of the extracted lines is smaller than the first number of lines. The fixation process fixes a first demand accommodated in a line that has not been extracted when the number of extracted lines has become equal to the first number of lines. The deletion process deletes the extracted lines. The determination process determines an order of changing line routes of demands.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Explanations will be given for a network design device according to embodiments.

Figure 1:
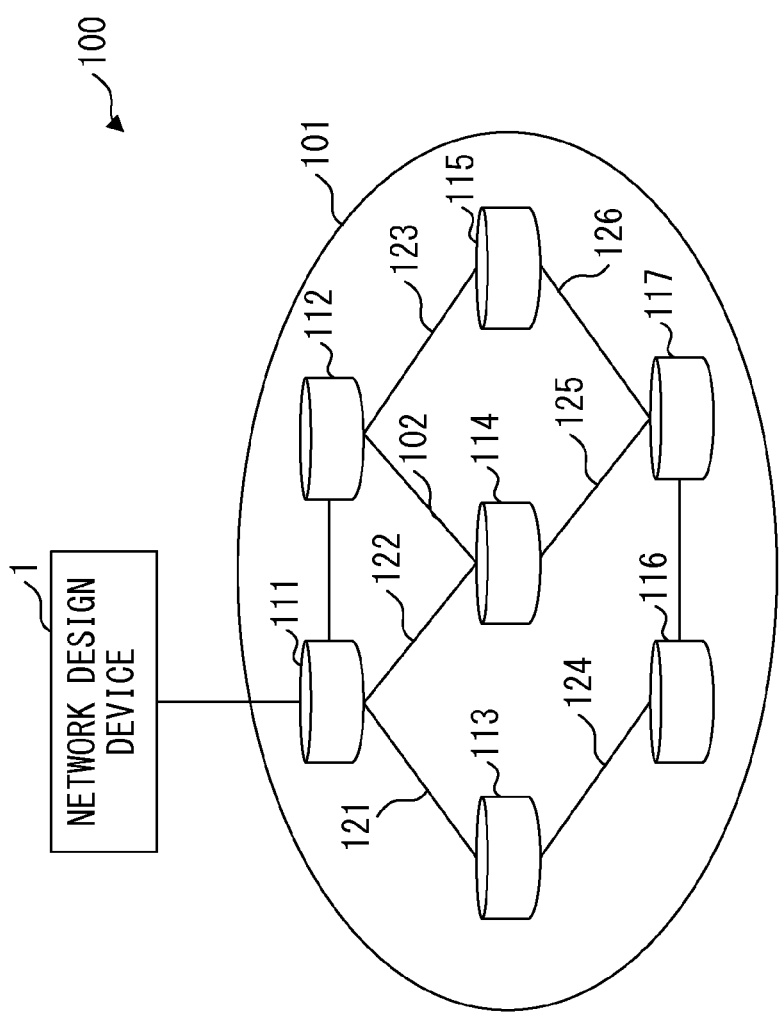
FIG. 1 illustrates an example of a network design system.
Figure 2:
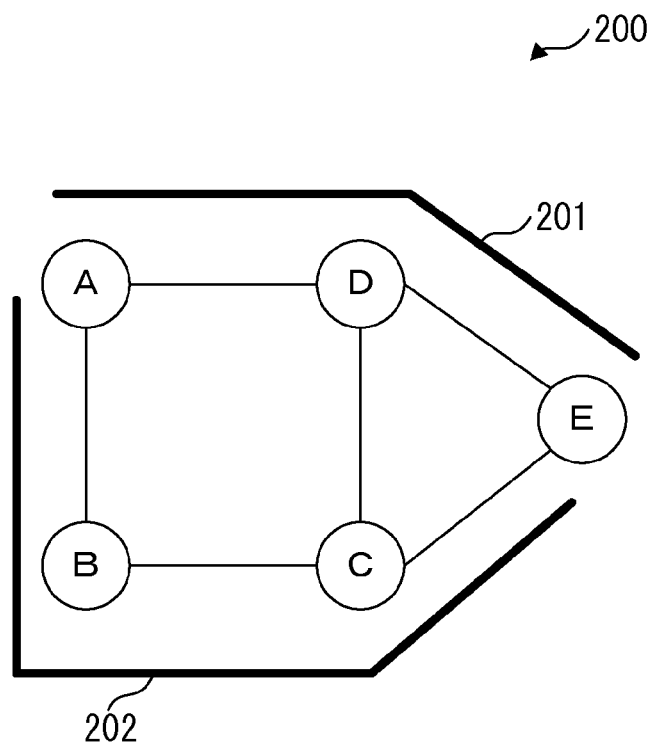
FIG. 2 illustrates optical lines and optical-line routes.
Figure 3A:
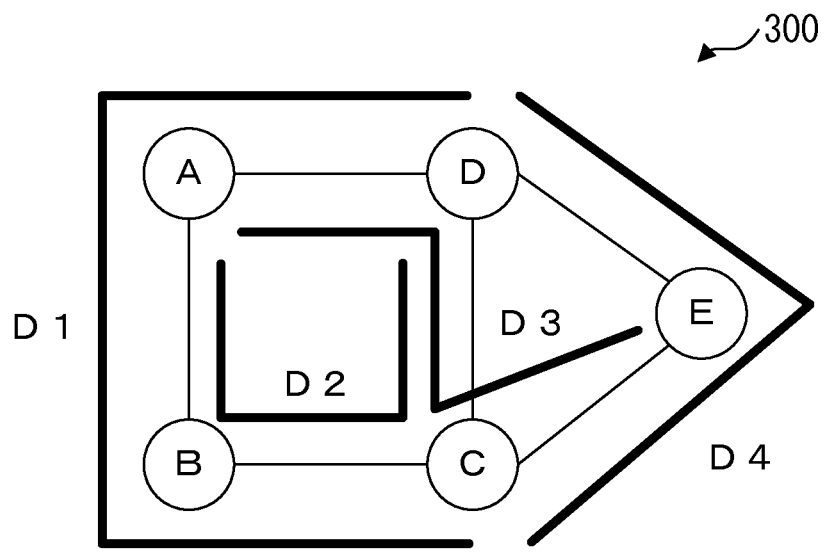
FIG. 3A and FIG. 3B illustrate changing of routes of demands in reoptimization.
Figure 3B:
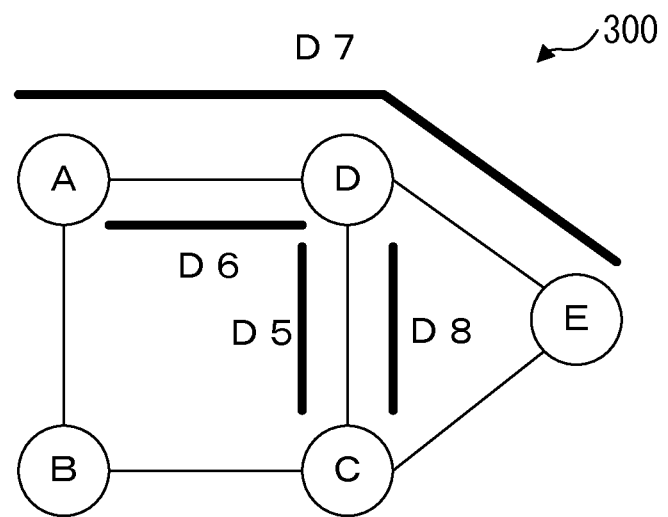

FIG. 1 illustrates an example of a network design system.

By referring to FIG. 1, explanations will be given for a network design system used for data communications.

A network design system 100 includes for example a network design device 1, node devices 111 through 117 and links 121 through 126. The network design device 1 and the node device 110 are for example computer apparatuses, which will be described later.

The node device 110 is provided in for example a station. The node device 110 assigns slots (bands) of optical lines that pass through the connected links 120 in response to a request from the network design device 1. In other words, the node device 110 has a function of switching routes of demands.

The links 120 connects node devices 110, and transfer data that is transmitted and received between the node devices 110. The links 120 may be implemented by for example an optical communication system obtained by combining a converter for the conversion between electric signals and optical signals and an optical fiber that is a transmission channel of data.

Figure 4:
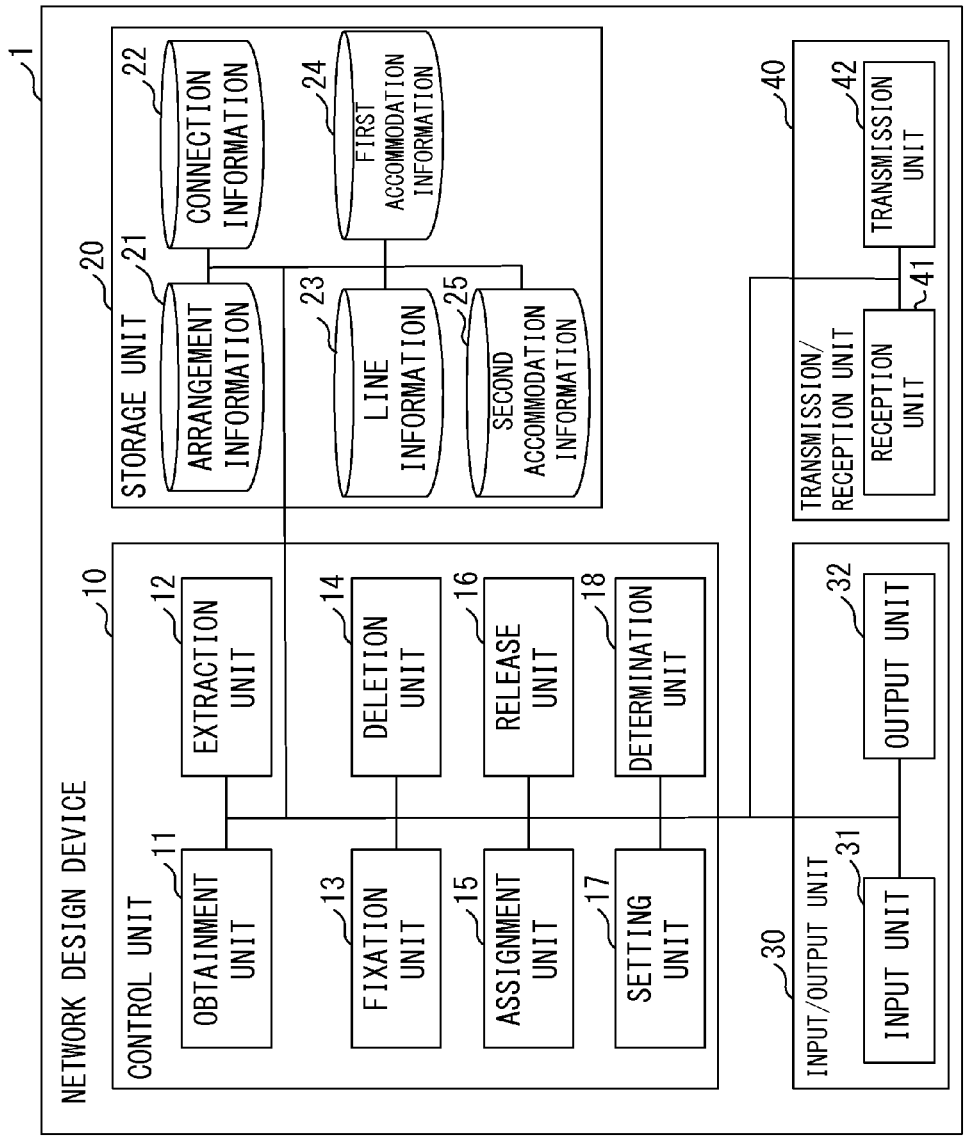
FIG. 4 is a functional block diagram illustrating an example of a network design device.

FIG. 4 is a functional block diagram illustrating an example of a network design device.

By referring to FIG. 4, the network design device 1 will be explained.

The network design device 1 includes for example a control unit 10, a storage unit 20, an input/output unit 30 and a transmission/reception unit 40.

The control unit 10 includes an obtainment unit 11, an extraction unit 12, a fixation unit 13, a deletion unit 14, an assignment unit 15, a release unit 16, a setting unit 17 and a determination unit 18. The storage unit 20 includes arrangement information 21, connection information 22, line information 23, first accommodation information 24 and second accommodation information 25. Also, the input/output unit 30 includes an input unit 31 and an output unit 32. The transmission/reception unit 40 includes a reception unit 41 and transmission unit 42.

The obtainment unit 11 obtains various types of information from users or a server connected for communication.

The obtainment unit 11 obtains the arrangement information 21 that represents where in the network 101 a station is arranged. Also, the obtainment unit 11 obtains the connection information 22 that represents which of the stations in the network 101 are connected by the links 120 (fiber). Further, the obtainment unit 11 obtains the line information 23 that represents the band and the route of each demand that is accommodated in optical lines in the network 101.

The obtainment unit 11 obtains the arrangement of optical lines in the network 101 before the reoptimization (before changing) and the first accommodation information 24 representing demands accommodated in the optical lines. Also, the obtainment unit 11 obtains the arrangement of optical lines in the network 101 after the reoptimization (after changing) and the second accommodation information 25 representing demands accommodated in the optical lines.

Then, the obtainment unit 11 writes the obtained arrangement information 21, connection information 22, line information 23, first accommodation information 24 and second accommodation information 25 to the storage unit 20.

The obtainment unit 11 obtains the number of optical lines that are deleted after reoptimization (first number of liens) among optical lines that pass through the same optical-line route. Optical lines that pass through the same optical-line route are optical lines having the same starting station and the same ending station and using the same optical-line route for connecting the starting and ending stations. The obtainment unit 11 refers to for example the first accommodation information 24 and the second accommodation information 25 so as to obtain changes in the number of optical lines that pass through the same optical-line route before and after reoptimization. When the number of optical lines passing through the same optical-line route before and after reoptimization has decreased, the obtainment unit 11 obtains the number of the optical lines that has been reduced as a number of the optical lines that are deleted (reduced) after the changing.

The extraction unit 12 extracts optical lines that have not accommodated demands that are to be accommodated before and after reoptimization (first demands). Demands to be accommodated before and after reoptimization are demands that are to be accommodated in optical lines that pass through the same optical-line route before and after reoptimization. The extraction unit 12 refers to the first accommodation information 24 and the second accommodation information 25 so as to obtain changes in demands that are to be accommodated in a group of optical lines passing through the same optical-line route before and after reoptimization. Also, when there is a demand that is accommodated in a group of optical lines passing through the same optical-line route before and after reoptimization, the extraction unit 12 determines that the demand is a demand to be accommodated before and after reoptimization. In the explanations below, a demand accommodated in a group of optical lines passing through the same optical-line route before and after reoptimization is also referred to as demand Db.

When the number of optical lines that does not accommodate demand Db is smaller than the number of optical lines that are deleted after reoptimization, the extraction unit 12 extracts optical lines in descending order of band of demand Db from among optical lines having demands Db until the total number of extracted optical lines becomes equal to the number of optical lines that are deleted. The total number of extracted optical lines is a sum of the number of extracted optical lines that does not accommodate demands Db and the number of extracted optical lines that have accommodated demands Db.

When the number of extracted optical lines has become equal to the number of optical lines that are deleted after reoptimization, the fixation unit 13 fixes demands Db accommodated in lines that have not been extracted. Fixing demands Db means that slots assigned to demands Db are not changed in a process of determining the order of changing routes of demands. In other words, the fixation unit 13 performs setting of assigning slots of optical lines that have not been extracted to the same demand Db before and after reoptimization.

When the number of optical lines that does not accommodate demands Db is equal to or greater than the number of optical lines that are deleted after reoptimization, the extraction unit 12 extracts as many optical lines that does not accommodate demands Db as there are optical lines that are deleted after reoptimization. Then, the fixation unit 13 fixes demands Db accommodated in lines that have not been extracted.

The deletion unit 14 deletes optical lines extracted by the extraction unit 12. Deletion of extracted optical lines means that demands are not accommodated in optical lines after reoptimization in a process of determining the order of changing routes of demands performed by the determination unit 18, which will be described later.

When the number of extracted optical lines has become equal to the number of optical lines that are deleted after reoptimization, the assignment unit 15 assigns unoccupied bands (unoccupied slots) of optical lines that have not been extracted to demands to be accommodated after the changing (second demands). Demands to be accommodated after the changing are demands to be accommodated in the network 101 newly after reoptimization or demands whose routes have been changed from the routes before reoptimization. Demands whose routes have been changed from the routes before reoptimization are for example demands that were accommodated in optical lines passing through other optical-line routes before reoptimization. In the explanations below, demands that are to be accommodated in the network 101 newly after reoptimization are also referred to as demands Dn.

When there is demand Dn that is not able to be accommodated, the release unit 16 obtains the number of optical lines that accommodate demands Dn (second number of lines). Demands Dn that are not able to be accommodated are demands Dn for which it is not possible for the assignment unit 15 to perform assignment of unoccupied band of optical lines that have not been extracted. The number of optical lines that accommodate demands Dn is the number of optical lines for securing the band that accommodates demands Dn that are not able to be accommodated.

The release unit 16 releases demands of as many optical lines as there are optical lines that accommodate demands Dn in ascending order of unoccupied band among optical lines having demands Db that are not extracted. Releasing demands of optical lines means that changing of routes of demands accommodated in optical lines is considered in the demand accommodation changing order determination process performed by the determination unit 18, which will be described later.

When demands accommodated in optical lines are released by the release unit 16, the fixation unit 13 fixes demands Db accommodated in optical lines which have not been extracted and from which demands have not been released.

When the determination unit 18 executes a process of obtaining the order of changing routes of demands, the setting unit 17 sets conditions in a calculation model so that optical lines that accommodate demands Db fixed by the fixation unit 13 are fixed. Fixing optical lines that accommodate demands Db means for example fixing time slots of optical lines assigned to demands Db.

Also, when the determination unit 18 executes a process of obtaining the order of changing routes of demands, the setting unit 17 may set conditions in a calculation model so that demands are not canceled. Canceling demands is disconnecting communications of data requested by the demands by cancelling the assignment of slots of optical lines to the demands.

Also, setting unit 17 may set, in a calculation model, conditions of the optimum design or suboptimum design, which will be described later.

By using the calculation model in which the conditions are set by the setting unit 17, the determination unit 18 determines the order of changing routes of demands so that the conditions set by the setting unit 17 are met. The determination unit 18 may obtain the order of changing routes of demands by performing for example ILP (Integer Linear Programming) calculation.

The input unit 31 receives input of data from for example users. Data input from users may include for example the arrangement information 21, the connection information 22, the line information 23, the first accommodation information 24 and the second accommodation information 25.

The output unit 32 outputs data to for example a connected device.

The transmission unit 42 transmits for example data output from the control unit 10 to a server or a terminal device.

The reception unit 41 receives data from for example a server or a terminal device (not illustrated). Then, the reception unit 41 inputs received data to the control unit 10. Data received from a server or a terminal device may include for example the arrangement information 21, the connection information 22, the line information 23, the first accommodation information 24 and the second accommodation information 25.

The transmission unit 42 transmits, to a server or a terminal device, data output for example from the control unit 10.

By referring to FIG. 5 through FIG. 7, explanations will be given for the determination of procedures of changing routes of demands in reoptimization.

By referring to FIG. 5A, F5B and FIG. 6, the optimum design will be explained.

Figure 5A:
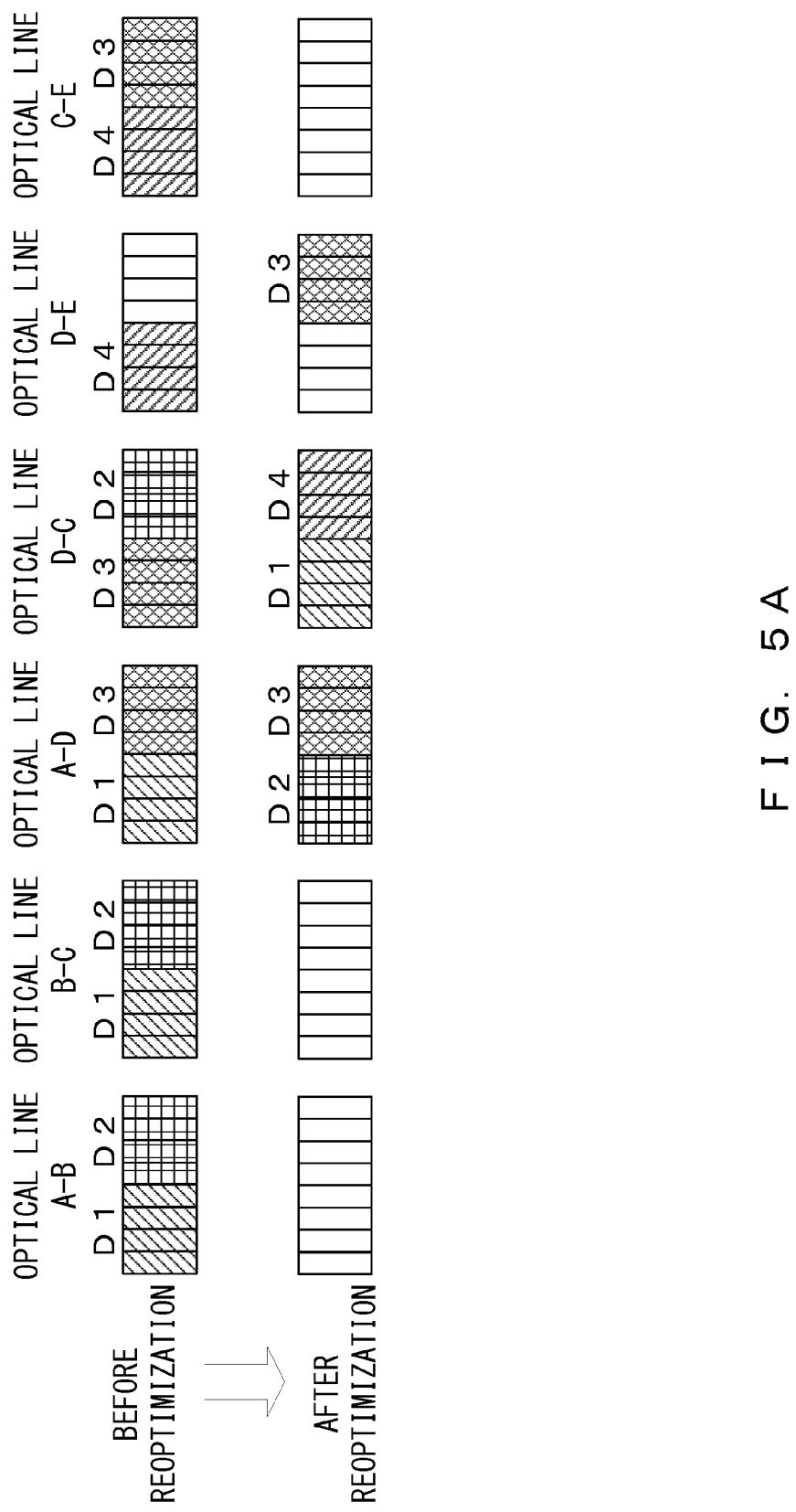
FIG. 5A and FIG. 5B illustrate assignment of slots of optical lines.

FIGS. 5A and F5B explain assignment of slots of optical lines. FIG. 6 is a view (first) illustrating procedures for reoptimization.

Optimum design is design that obtains the order of changing routes of demands from routes before reoptimization to routes after reoptimization under conditions for example that demands are not canceled and the route of each demand is changed utmost once.

Figure 6:
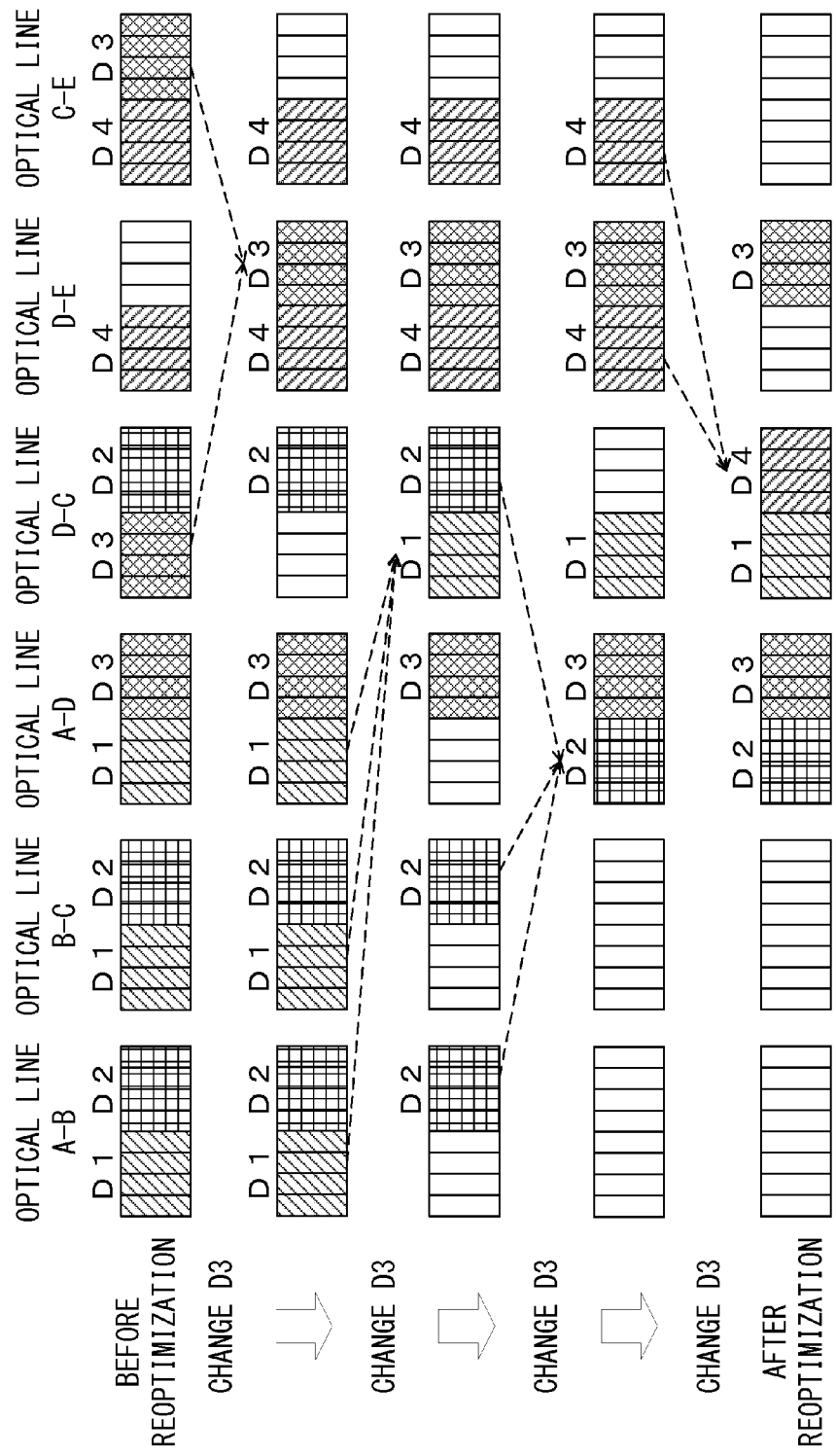
FIG. 6 is a view (first) illustrating procedures for reoptimization.

When the slots after reoptimization illustrated in FIG. 5A are assigned, the network design device 1 may perform optimum design by changing routes of demands as illustrated in FIG. 6.

By referring to FIG. 5 and FIG. 7, the suboptimum design will be explained.

Suboptimum design is design that obtains the order of changing routes of demands from routes before reoptimization to routes after reoptimization under conditions for example that utmost one demand is cancelled and the route of each demand is changed utmost once.

Figure 5B:
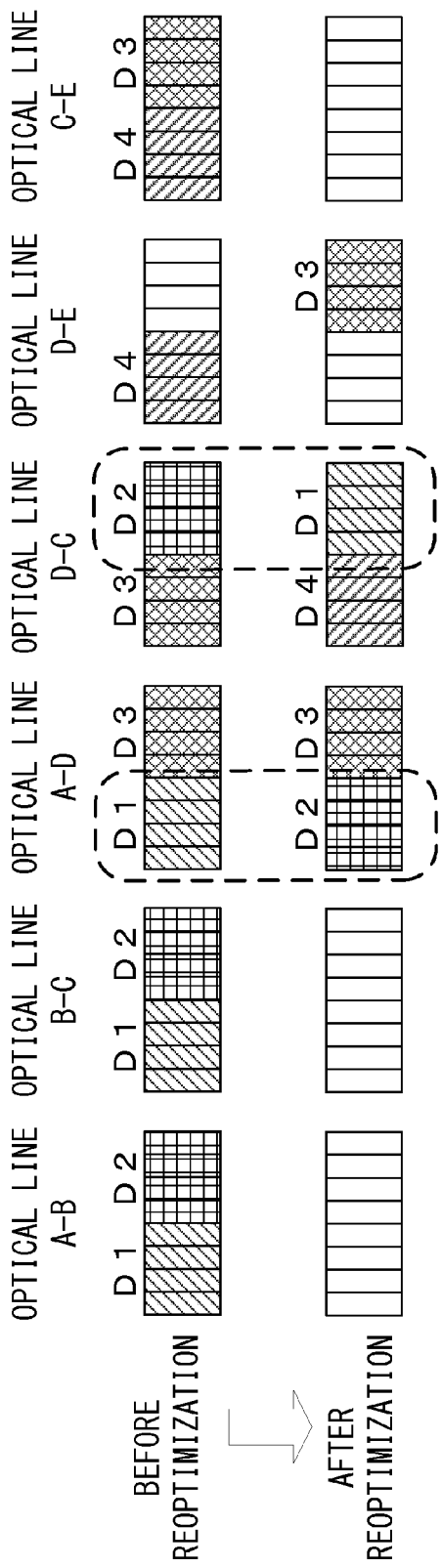

When the slots after reoptimization illustrated in FIG. 5B are assigned, the network design device 1 needs to change the route of demand D2 first in order to change the route of demand D1 when the optimum design is to be achieved. Also, when the slots after reoptimization illustrated in FIG. 5B are assigned, the network design device 1 needs to change the route of demand D1 first in order to change the route of demand D2 when the optimum design is to be achieved. As described above, when the slots after reoptimization illustrated in FIG. 5B have been assigned, a so-called deadlock occurs when the network design device 1 attempts to achieve optimum design.

Figure 7:
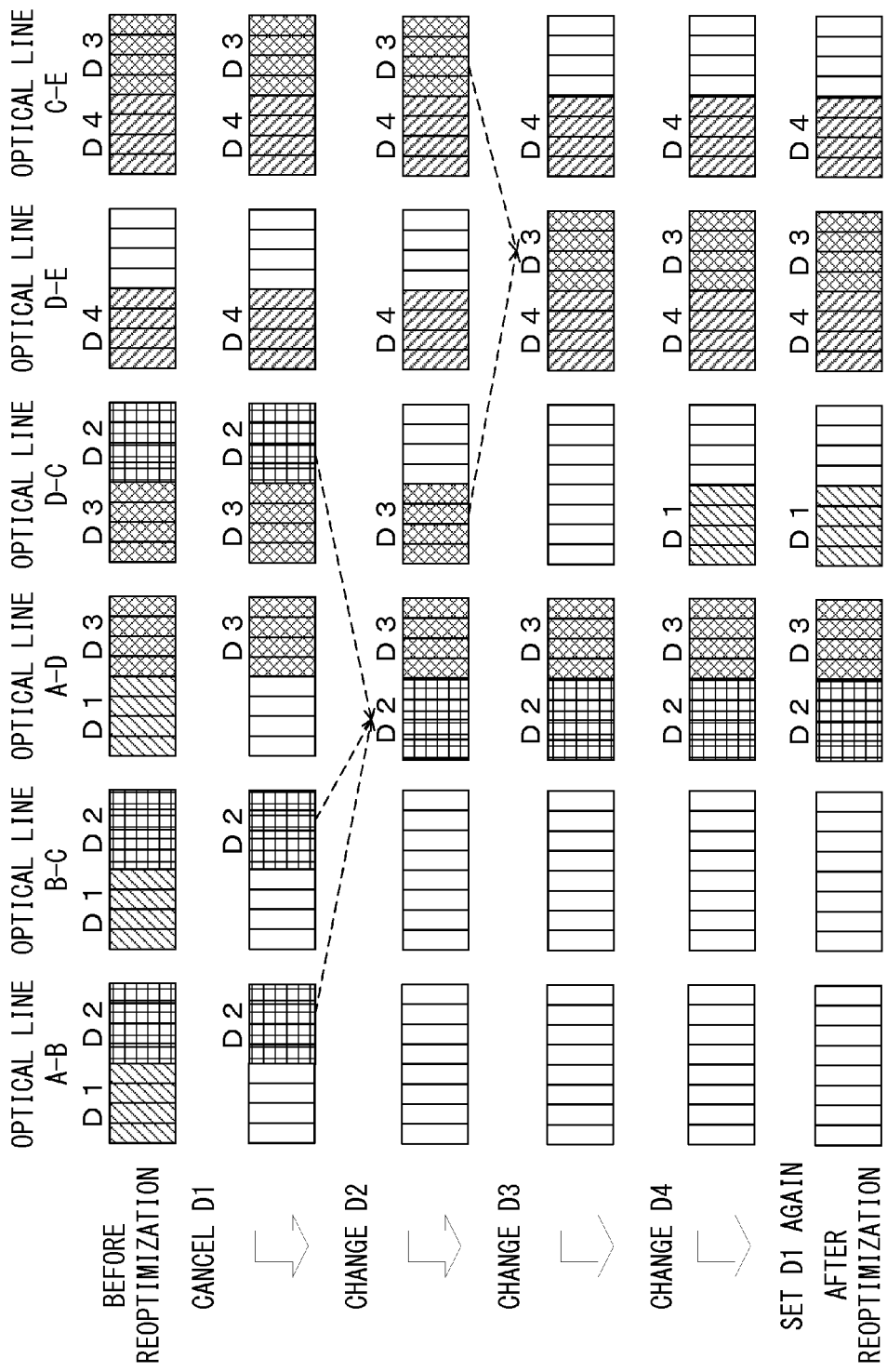
FIG. 7 is a view (second) illustrating procedures for reoptimization.

Then, the network design device 1 changes routes of demands by cancelling demand D1 so as to execute the suboptimum design as illustrated in FIG. 7.

The slot assignment pattern after reoptimization illustrated in FIG. 5A and the slot assignment pattern after reoptimization illustrated in f5B are only different in the slots that have been assigned to the demand accommodated in optical line D-C. However, a difference is caused that the optimum design is possible in the network design device 1 by using the slot assignment pattern after reoptimization illustrated in FIG. 5A whereas the optimum design is impossible when the slot assignment pattern after reoptimization illustrated in FIG. 5B is used.

Figure 8:
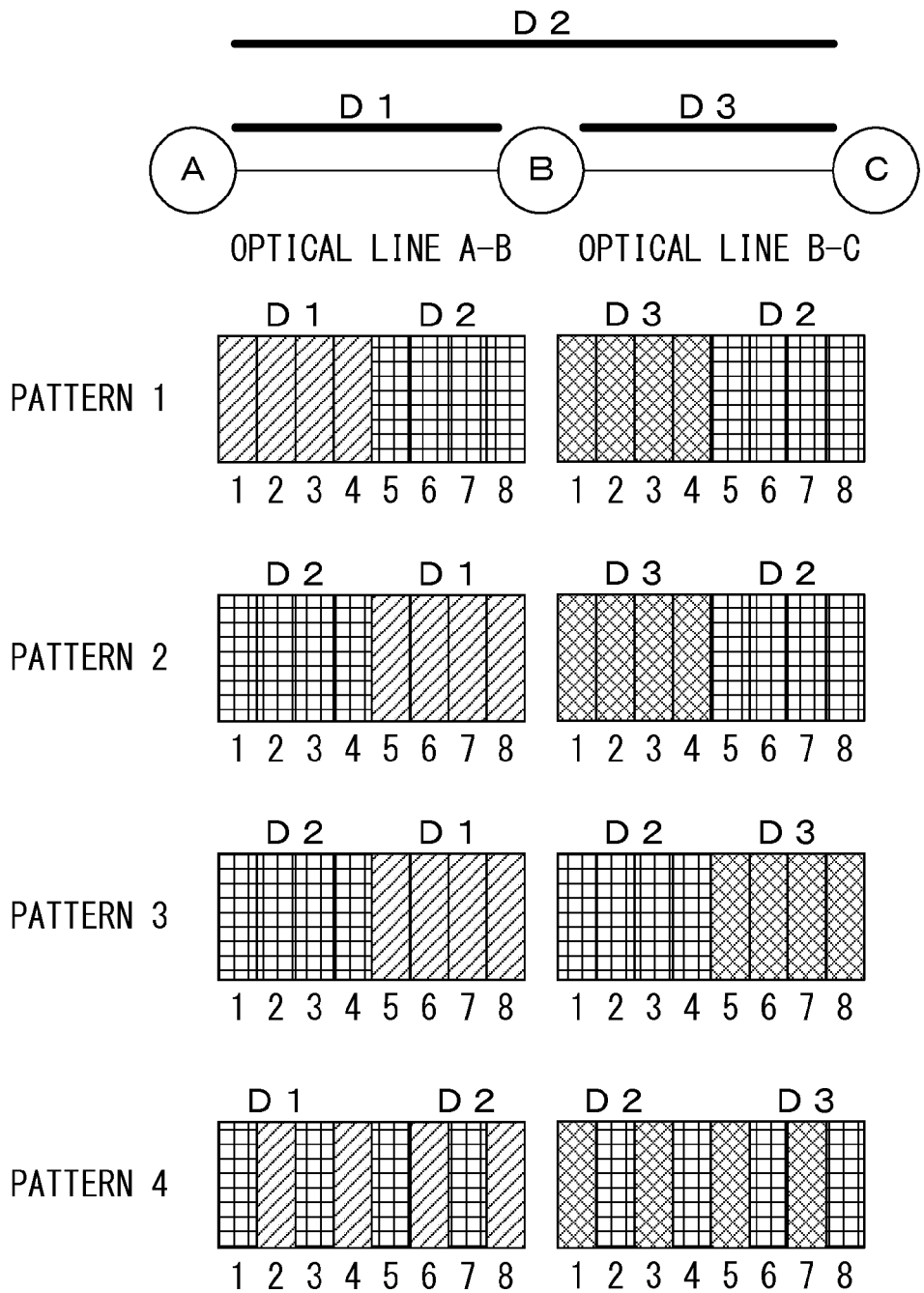
FIG. 8 illustrates patterns of assigning slots of optical lines.

As illustrated in FIG. 8, there are a plurality of types of slot assignment patterns.

Because the slot assignment pattern before reoptimization has already been determined as explained by referring to FIG. 5, whether the optimum design or the suboptimum design is possible is determined by how the slot assignment patter after reoptimization is set. Accordingly, the slot assignment pattern after reoptimization may be determined in such a manner that the optimum design will be able to be achieved with the highest possible probability.

Figure 9:
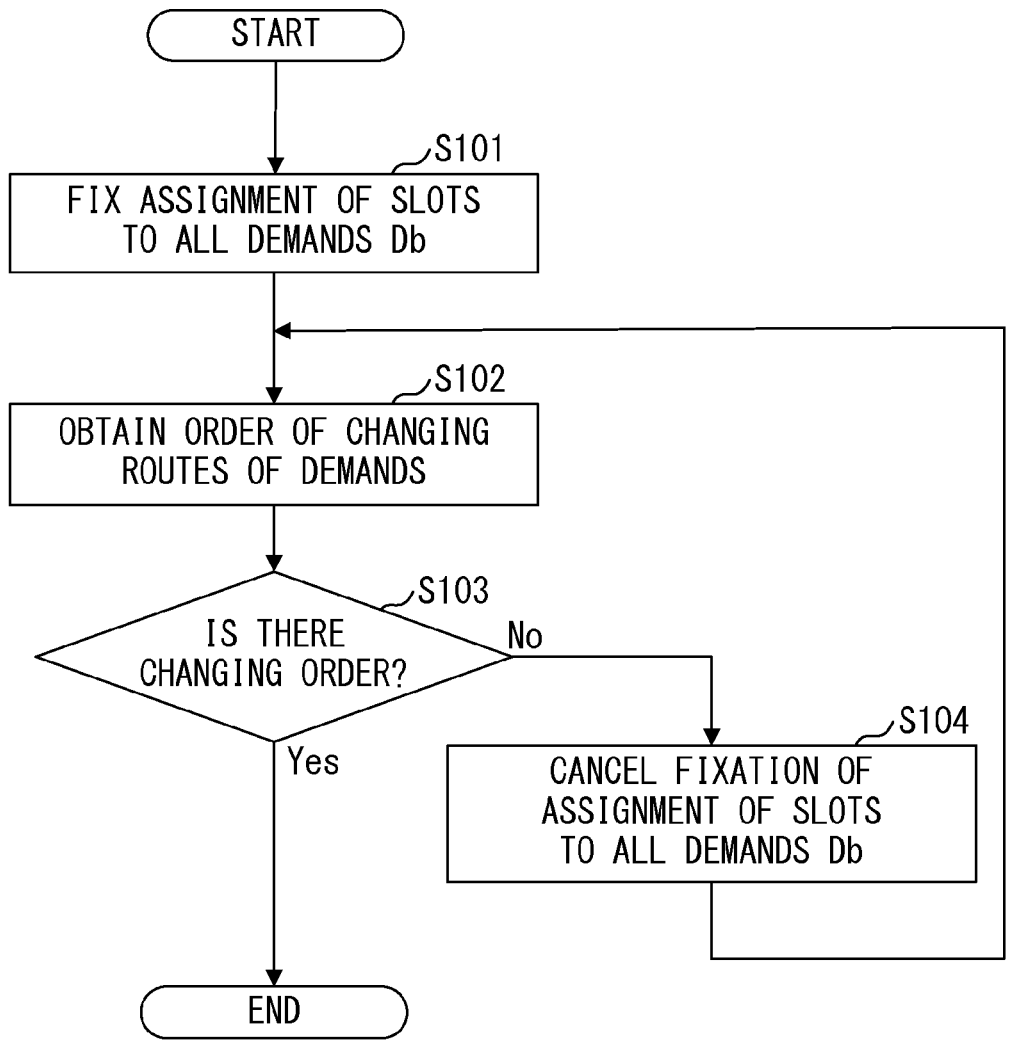
FIG. 9 is a flowchart illustrating a demand accommodation changing order determination process that fixes all demands Db.

FIG. 9 is a flowchart illustrating a demand accommodation changing order determination process that fixes all demands Db.

By referring to FIG. 9, the demand accommodation changing order determination process of fixing all demands Db will be explained. The demand accommodation changing order determination process is a process of obtaining the order of changing routes of demands so that the slot assignment pattern before reoptimization is changed to the slot assignment pattern after reoptimization. In the explanations below, it is assumed that the slot assignment patter after reoptimization is given by users or a server or has been determined by the network design device 1.

Figure 10A:
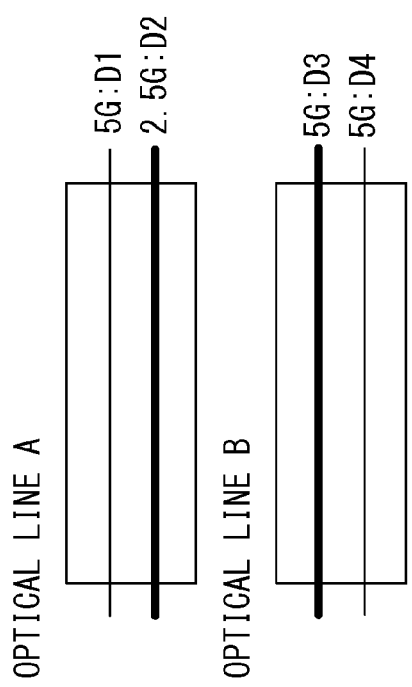
FIG. 10A and FIG. 10B are figures (first) that explain the demand accommodation changing order determination process that fixes all demands Db.
Figure 10B:
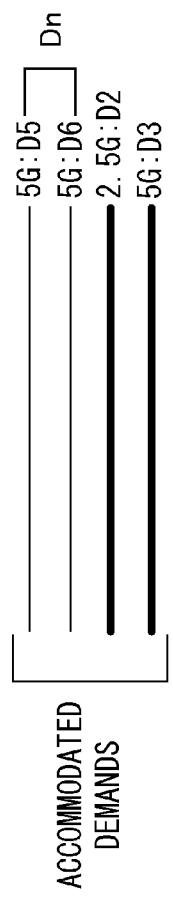
Figure 10B:
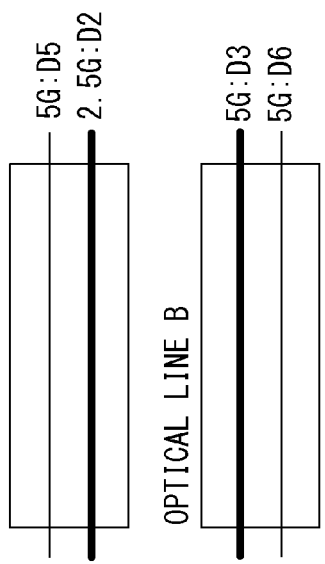
Figure 11A:
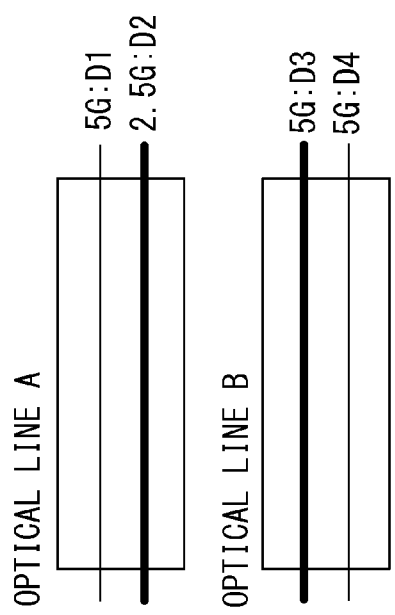
FIG. 11A and FIG. 11B are figures (second) that explain the demand accommodation changing order determination process that fixes all demands Db.

The network design device 1 fixes assignment of slots to all demands Db (S101). When for example there are optical line A and optical line B in the same optical-line route as illustrated in FIG. 10A and FIG. 11A, the network design device 1 fixes routes of demands D2 and D3 accommodated before and after reoptimization. In FIG. 10A, FIG. 10B, FIG. 11A and FIG. 11B, the demands represented by the thick lines are demands Db. In FIG. 10A and FIG. 11A, the demands represented by the thin lines are demands Dn.

Then, the network design device 1 obtains the order of changing routes of demands (S102).

The network design device 1 determines whether or not the changing order has been obtained (S103).

Figure 11B:
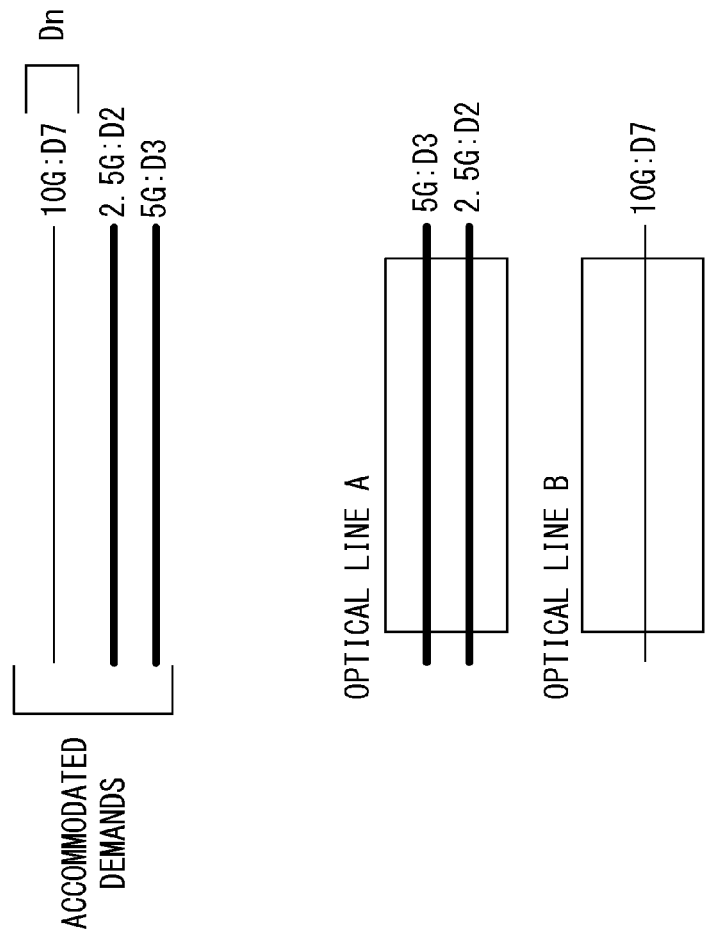

When the changing order is not obtained (No in S103), the network design device 1 cancels the fixation of slot assignment to all demands Db (S104). Then, the network design device 1 executes the process in S102. When for example new demand D7 has been added after reoptimization as illustrated in FIG. 11B, the network design device 1 determines that there is not a changing order because it is impossible to accommodate demand D7 in a network without releasing optical line A or B. Then, the network design device 1 releases optical lines A and B and takes the changing of routes of demands D2 and D3 into consideration when the order of changing routes of demands is obtained next. As described above, in a case when it is impossible to achieve optimum design when the order of changing routes of demands is obtained by fixing demands Db, the network design device 1 obtains the order of changing routes of demands by cancelling the fixation of demands Db, leading to increase in loads of calculation processes in some cases.

When the changing order has been obtained (Yes in S103), the network design device 1 terminates the demand accommodation changing order determination process. When for example new demands D5 and D6 have been added after reoptimization as illustrated in FIG. 10B, the network design device 1 terminates the demand accommodation changing order determination process because the optimum design is possible. In such a case, because demands Db have been fixed, the changing of routes of demands Db are not considered when obtaining the order of changing routes of demands, and accordingly the loads of calculation processes are smaller than a case where the routes of all demands are considered.

Figure 12:
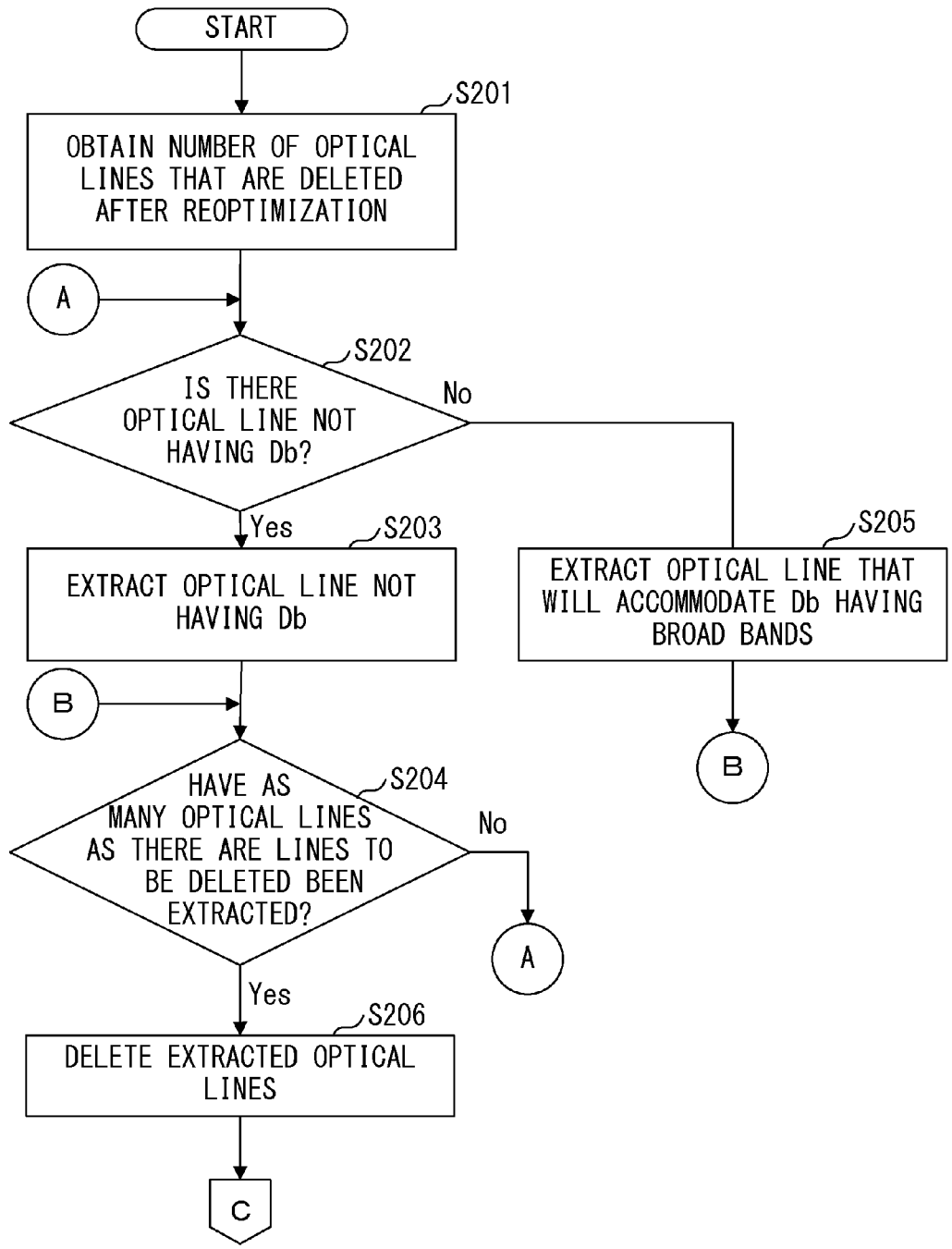
FIG. 12 is a flowchart (first) illustrating the demand accommodation changing order determination process that fixes appropriate demand Db.
Figure 13:
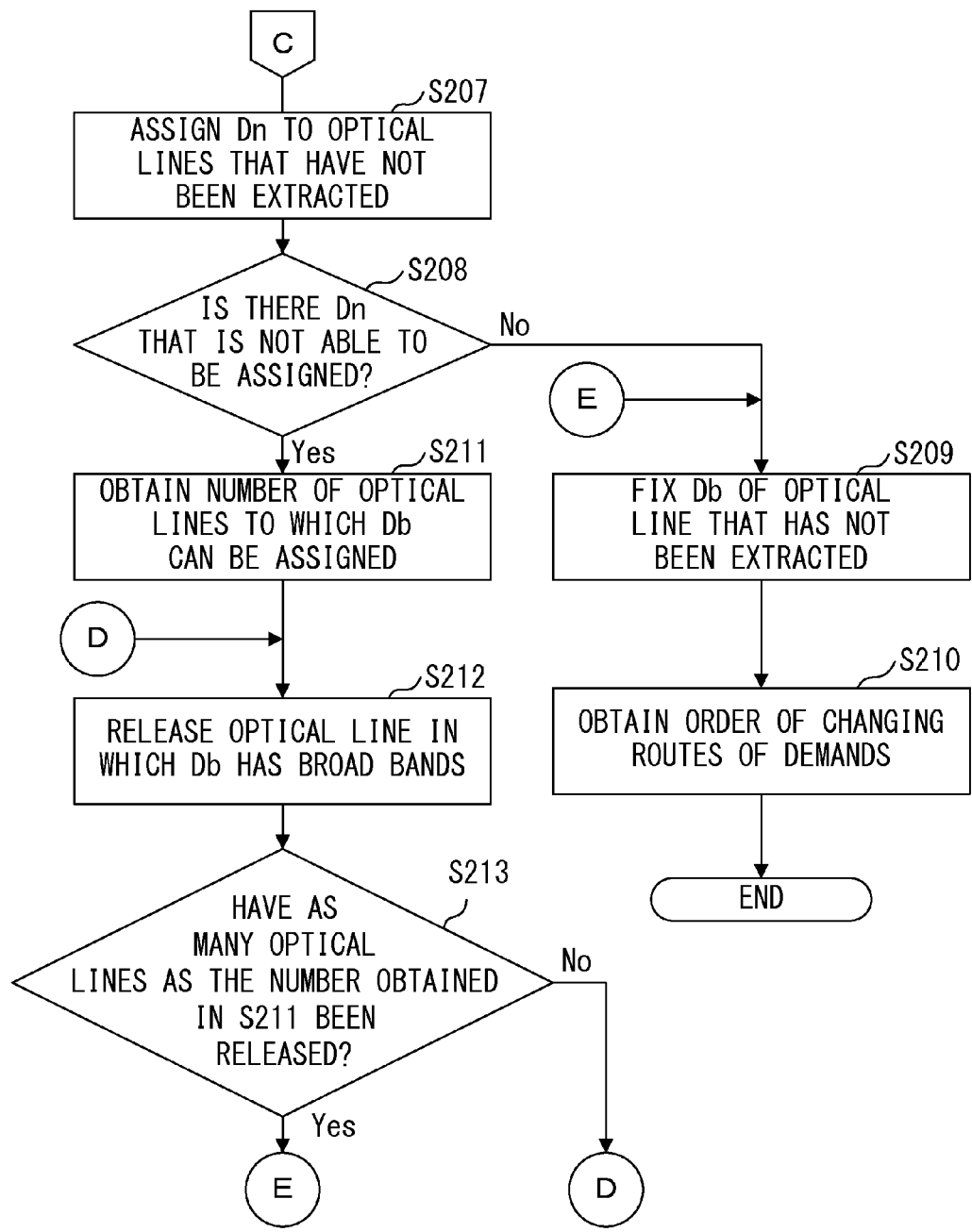
FIG. 13 is a flowchart (second) illustrating the demand accommodation changing order determination process that fixes appropriate demand Db.

FIG. 12 and FIG. 13 are flowcharts illustrating the demand accommodation changing order determination process that fixes appropriate demand Db.

By referring to FIG. 12 and FIG. 13, the demand accommodation changing order determination process that fixes appropriate demand Db will be explained. In the explanations below, it is assumed that the slot assignment pattern after reoptimization is given by users or a server or has been determined in the network design device 1.

Figure 14A:
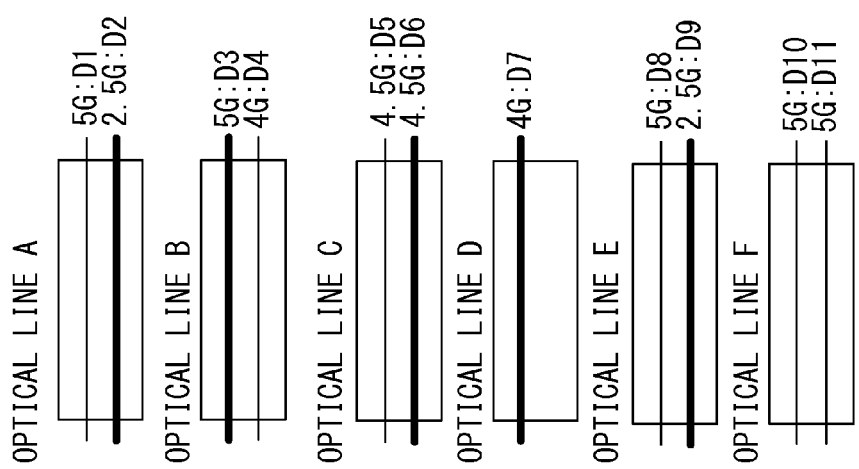
FIG. 14A and FIG. 14B are figures that explain the demand accommodation changing order determination process that fixed appropriate demands Db.
Figure 14B:
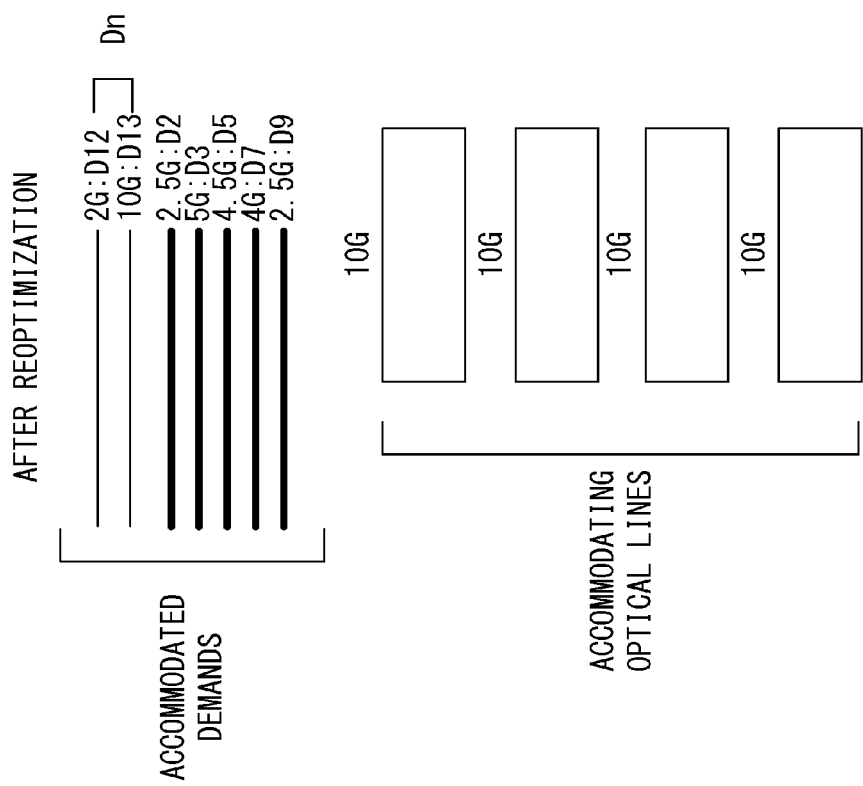

The network design device 1 obtains the number of optical lines that are deleted after reoptimization (S201). As illustrated in FIG. 14A and FIG. 14B, the network design device 1 obtains the value "2" as the number of optical lines that are deleted when the number of optical lines passing through the same optical-line route decreases from six as the number before reoptimization to four as the number after reoptimization. Also, in FIGS. 14A and F14B, the demands represented by the thick lines are demands Db. In FIG. 14A, the demands represented by the thin lines are demands that are deleted from the network after reoptimization. In FIG. 14B, the demands represented by the thin lines are demands Dn.

Also, the network design device 1 determines whether or not there is an optical line not having demand Db (S202).

When there is an optical line not having demand Db (Yes in S202), the network design device 1 extracts an optical line not having demand Db (S203). When the optical lines before reoptimization illustrated in FIG. 14A exist, the network design device 1 extracts demands D10, represented by the thin lines, that are deleted after reoptimization and optical line F accommodating demand D11.

The network design device 1 determines whether or not as many optical lines as there are optical lines that are to be deleted have been extracted (S204).

When as many optical lines as there are optical lines that are to be deleted have not been extracted (No in S204), the network design device 1 executes the process in S202.

In S202, when there is not an optical line not having demand Db (Non in S202), the network design device 1 extracts an optical line that will accommodate demand Db having a broad band (or an optical line having a small unoccupied band) (S205). Then, the network design device 1 executes the process in S204. When the optical lines before reoptimization illustrated in FIG. 14A exist, the network design device 1 extracts optical line B, which will accommodate demand D3 having a broad band of demand Db.

In S204, when as many optical lines as there are lines that are deleted have been extracted (Yes in S204), the network design device 1 deletes the extracted optical lines (S206). Then, the network design device 1 executes the process is S207.

Explanations will be given by referring to FIG. 13.

The network design device 1 assigns demand Dn to an optical line that has not been extracted (S207). When there are optical lines after reoptimization as illustrated in FIG. 14B, the network design device 1 assigns demand D12 to optical line C, which has a narrow unoccupied band. Then, the network design device 1 stores that the unoccupied band of optical line C is "10 G−4.5 G−2 G=3.5 G". In S207, the network design device 1 may perform assignment to an optical line having a narrow unoccupied band for example starting from demand Dn having a narrow band in ascending order of band.

Then, the network design device 1 determines whether or not there is demand Dn that is not able to be assigned (S208).

When there is a demand Dn that is not able to be assigned (Yes in S208), the network design device 1 fixes Db of an optical line that has not been extracted (S209).

Then, the network design device 1 executes a process of obtaining the order of changing routes of demands (S210).

In S208, when there is demand Dn that is not able to be assigned (Yes in S208), the network design device 1 obtains the number of optical lines to which demands Dn can be assigned (S211). When there are optical lines after reoptimization as illustrated in FIG. 14B, it is not possible for the network design device 1 to assign a band to demand D13 whose band is 10 G. Accordingly, the network design device 1 determines to release one optical line for accommodating demand D13.

Then, the network design device 1 releases an optical line in which the band of demand Db is broad (S212). In S212, by releasing an optical line in which the band of demand Db is broad, the network design device 1 can increase the degree of design freedom in the process of obtaining the order of changing routes of demands.

The network design device 1 determines whether or not as many optical lines as there are optical lines to which demands Dn can be assigned have been released (S213).

When as many optical lines as there are optical lines to which demands Dn can be assigned have not been released (No in S213), the network design device 1 executes the process in S212.

When as many optical lines as there are optical lines to which demands Dn can be assigned have been released (Yes in S213), the network design device 1 executes the process in S209.

Figure 15:
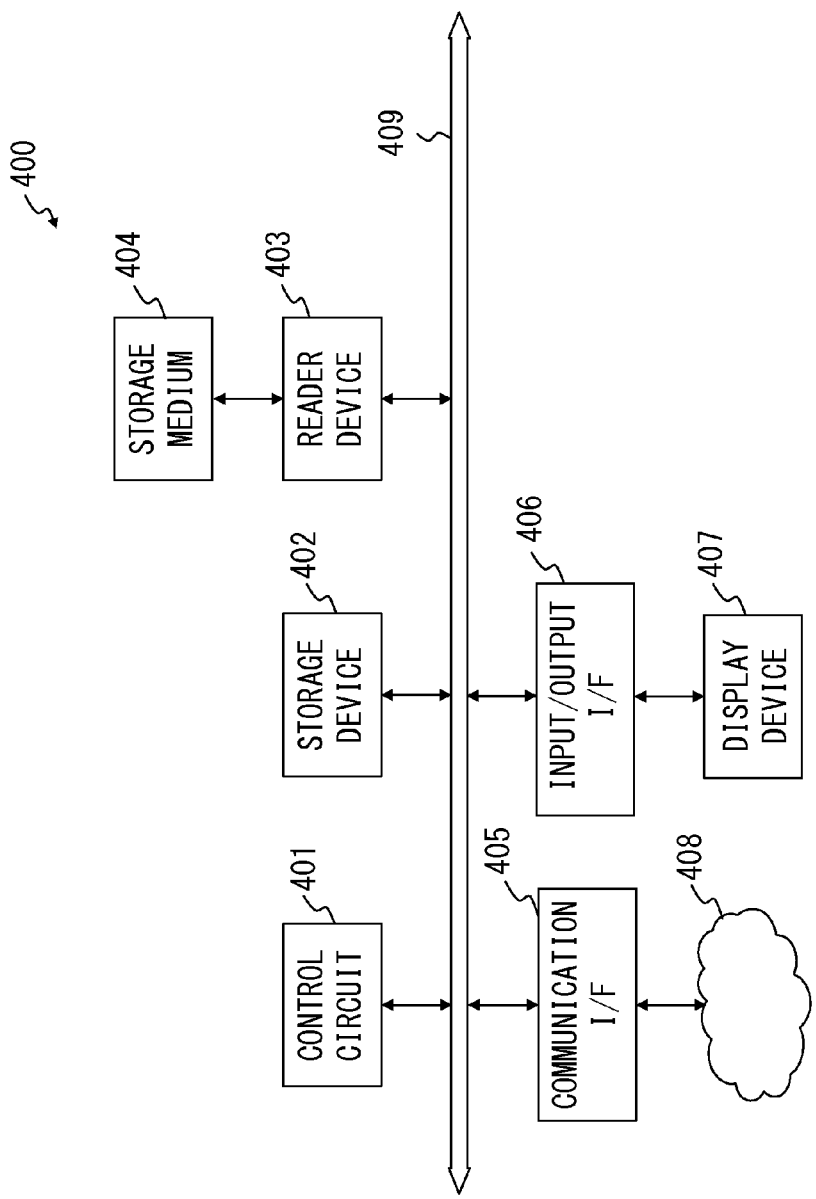
FIG. 15 is a block diagram illustrating an example of a computer device.

FIG. 15 is a block diagram illustrating an example of a computer apparatus.

By referring to FIG. 15, explanations will be given for a configuration of the network design device 1.

In FIG. 15, a computer apparatus 400 includes a control circuit 401, a storage device 402, a reader device 403, a storage medium 404, a communication interface (communication I/F) 405, an input/output interface (input/output I/F) 406, a display device 407 and a network 408. The respective devices are connected via a bus 409.

The control circuit 401 entirely controls the computer apparatus 400. The control circuit 401 is for example a processor such as a CPU, a multicore CPU, an FPGA (Field Programmable Gate Array), a PLD (Programmable Logic Device), etc. The network design device 1 functions as the control unit 10 for example in FIG. 4. Also, in FIG. 4, the arrangement information 21, the connection information 22, the line information 23, the first accommodation information 24 and the second accommodation information 25 stored in the storage unit 20 may be stored in for example cache memories of a CPU, an FPGA and a PLD.

The storage device 402 stores various types of data. The storage device 402 functions as for example a memory such as a ROM (Read Only Memory), a RAM (Random Access Memory), etc. and as a HD etc. The storage device 402 functions as the storage unit 20 for example in FIG. 4.

Also, the ROM stores programs such as a boot program etc. The RAM is used as a work area of the control circuit 401. The HD stores programs such as an OS, an application program, firmware, etc. and various types of data.

The storage device 402 stores for example a demand accommodation changing order determination program that makes the control circuit 401 function as the control unit 10.

When a demand accommodation changing order determination process is performed, the network design device 1 reads, to the RAM, the demand accommodation changing order determination program stored in the storage device 402. By making the control circuit 401 execute the demand accommodation changing order determination program read to the RAM, the network design device 1 executes the demand accommodation changing order determination process. The demand accommodation changing order determination process includes an obtainment process, an extraction process, a fixation process, a deletion process, an assignment process, a release process, a setting process or a determination process or any combination there of.

The demand accommodation changing order determination program may be stored in a storage device included in a server in the network 408 when the control circuit 401 is accessible via the communication interface 405.

The reader device 403 is controlled by the control circuit 401 so as to read/write data in the control circuit 401 that is detachable. The reader device 403 is for example an FDD (Floppy Disk Drive), a CDD (Compact Disc Drive), a DVDD (Digital Versatile Disk Drive), a BDD (Blu-ray (registered trademark) Disk Drive), a USB (Universal Serial Bus), etc.

The storage medium 404 stores various types of data. The storage medium 404 stores for example a demand accommodation changing order determination program. Further, the storage medium 404 may store the arrangement information 21, the connection information 22, the line information 23, the first accommodation information 24 and the second accommodation information 25 illustrated in FIG. 4.

Also, the storage medium 404 is connected to the bus 409 via the reader device 403, and the control circuit 401 controls the reader device 403 so that data is read/written. Thereby, data stored in the storage medium 404 may also be written to the storage device 402. The storage medium 404 is for example a non-transitory computer-readable recording medium such as an FD (Floppy Disk), a CD (Compact Disc), a DVD (Digital Versatile Disk), a BD (Blu-ray Disk: registered trademark), and a flash memory, etc.

The communication interface 405 connects the computer apparatus 400 and other devices via the network 408 in such a manner that communication is possible. The communication interface 405 may receive the arrangement information 21, the connection information 22, the line information 23, the first accommodation information 24 and the second accommodation information 25 that are provided from a server that is connected in such a manner that communication is possible. The communication interface 405 functions as the transmission/reception unit 40 illustrated in for example FIG. 4.

When the input/output interface 406 is connected to for example devices such as a keyboard, a mouse, a touch panel, etc., and signals representing various types of information have been input from such connected devices, the input/output interface 406 outputs the input signals to the control circuit 401 via the bus 409. Also, when signals representing various types of information output from the control circuit 401 have been input, the input/output interface 406 outputs those signals to respective connected devices. The input/output interface 406 may receive the arrangement information 21, the connection information 22, the line information 23, the first accommodation information 24 and the second accommodation information 25 that are input by for example users. The input/output interface 406 functions as the input/output unit 30 in for example FIG. 4.

The display device 407 is connected to for example the input/output interface 406 and displays various types of information.

The network 408 is for example a LAN, wireless communications, the Internet, etc. and connects the computer apparatus 400 to other devices in such a manner that communication is possible.

As described above, in a demand accommodation changing order determination process according to an embodiment, as many optical lines having no demands Db to accommodate before and after reoptimization and as many optical lines having broad bands of demands Db as there are optical lines that are reduced by the reoptimization are deleted, and the route changing procedure of demands is determined. Thereby, according to the demand accommodation changing order determination process, it is possible reduce loads of calculation processing in a reoptimization process.

Also, in a demand accommodation changing order determination process according to an embodiment, the number of optical lines that are deleted after reoptimization is obtained from among optical lines that pass through the same optical-line route included in a network. Also, in a demand accommodation changing order determination process, optical lines not accommodating demands Db and optical lines that will accommodate demands Db having broad bands are extracted so as to delete as many extracted optical lines as there are optical lines that are deleted after reoptimization. Then, in the demand accommodation changing order determination process, demands Db accommodated in optical lines that have not been extracted are fixed so as to obtain the order of changing line routes of demands. In other words, in the demand accommodation changing order determination process, when the order of changing line routes of demands, optical lines that fix demands Db are taken into consideration in descending order of unoccupied band. Thereby, the demand accommodation changing order determination process increases a possibility that unoccupied bands of optical lines used after reoptimization can be assigned to demands that are not fixed. Accordingly, the demand accommodation changing order determination process can suppress the occurrence of recalculation caused by a situation where the changing order is not obtained and can reduce the loads of calculation processes in a reoptimization process.

Further, in a demand accommodation changing order determination process according to an embodiment, an unoccupied band of an optical line used after reoptimization is assigned to demand Dn that is newly accommodated after reoptimization. Also, in the demand accommodation changing order determination process, when there is demand Dn that is not able to be accommodated in an optical line used after reoptimization, demands Db of fixed optical lines are released in ascending order of unoccupied band in order to secure a band used for accommodating demand Dn. In other words, in the demand accommodation changing order determination process, when the order of changing line routes of demands is obtained, an optical line that can accommodate demand Dn is secured in advance. This increases a possibility that unoccupied bands of optical lines used after reoptimization can be assigned to demands that are not fixed according to the demand accommodation changing order determination process. Accordingly, the demand accommodation changing order determination process can suppress the occurrence of recalculation caused by a situation where a changing order is not obtained and can reduce the loads of calculation processes in a reoptimization process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A demand accommodation changing order determination method that is executed by a processor of a computer apparatus, wherein
the processor executes a process including:
obtaining a first number which represents a number of deleted lines that are deleted after changing routes of demands among lines that pass through a same line route;
extracting one or more first lines in which the demands are not accommodated before and after the changing the route of the demands;
extracting one or more second lines from among the lines in which the demands are accommodated in descending order of a band of each of the demands until a total number of the extracted first lines and the extracted second lines reaches the obtained first number when a number of the extracted first lines is smaller than the obtained first number;
deleting the extracted first lines and the extracted second lines when the total number has become equal to the obtained first number;
fixing first demands among the demands, the first demands being accommodated in non-extracted lines that have not been extracted; and
obtaining an order of the changing routes of the demands under a situation that the first demands are fixed.

2. The demand accommodation changing order determination method according to claim 1, wherein
the process further includes:
assigning an unoccupied band of each of the non-extracted lines to a second demand, which is accommodated after the changing the route of the demands, when the total number has become equal to the obtained first number;
obtaining a second number of lines that are needed to accommodate the second demand when the second demand that is not able to be accommodated exits; and
releasing the demands accommodated to lines, a number of which is identical to the obtained second number, in ascending order of unoccupied band of each of the non-extracted lines from the non-extracted lines, and
the fixing is executed after the releasing.

3. The demand accommodation changing order determination method according to claim 1, wherein
the lines each includes a time slot based on time-division multiplexing, and
in the fixing, an assignment of the time slot of each of the non-extracted lines to the first demands is fixed.

4. A non-transitory computer-readable recording medium having stored therein a program for causing a processor of a computer apparatus to execute a process, wherein
the process includes:
obtaining a first number which represents a number of deleted lines that are deleted after changing routes of demands among lines that pass through a same line route;
extracting one or more first lines in which the demands are not accommodated before and after the changing the route of the demands;
extracting one or more second lines from among the lines in which the demands are accommodated in descending order of a band of each of the demands until a total number of the extracted first lines and the extracted second lines reaches the obtained first number when a number of the extracted first lines is smaller than the obtained first number;
deleting the extracted first lines and the extracted second lines when the total number has become equal to the obtained first number;
fixing first demands among the demands, the first demands being accommodated in non-extracted lines that have not been extracted; and
obtaining an order of the changing routes of the demands under a situation that the first demands are fixed.

5. The non-transitory computer-readable recording medium according to claim 4, wherein
the process further includes:
assigning an unoccupied band of each of the non-extracted lines to a second demand, which is accommodated after the changing the route of the demands, when the total number has become equal to the obtained first number;
obtaining a second number of lines that are needed to accommodate the second demand when the second demand that is not able to be accommodated exits; and
releasing the demands accommodated to lines, a number of which is identical to the obtained second number, in ascending order of unoccupied band of each of the non-extracted lines from the non-extracted lines, and
the fixing is executed after the releasing.

6. The non-transitory computer-readable recording medium according to claim 4, wherein
the lines each includes a time slot based on time-division multiplexing, and
in the fixing, an assignment of the time slot of each of the non-extracted lines to the first demands is fixed.

* * * * *